United States Patent [19]
Obermann et al.

[11] Patent Number: 5,546,573
[45] Date of Patent: Aug. 13, 1996

[54] SPECIFICATION OF CULTURAL BIAS IN DATABASE MANAGER

[75] Inventors: David F. Obermann; Mary K. Trumble, both of Austin, Tex.

[73] Assignee: International Business Machines Corporation, Armonk, N.Y.

[21] Appl. No.: 143,941

[22] Filed: Oct. 27, 1993

[51] Int. Cl.$^6$ .................................................. G06F 17/30
[52] U.S. Cl. .................................. 395/600; 364/DIG. 1; 364/283.3
[58] Field of Search ................................. 395/600, 700; 364/419.07

[56] References Cited

U.S. PATENT DOCUMENTS

| | | | |
|---|---|---|---|
| 4,774,655 | 9/1988 | Kollin et al. | 395/600 |
| 4,800,485 | 1/1989 | Ackroff et al. | 395/600 |
| 4,862,408 | 8/1989 | Zamora | 364/419.08 |
| 5,109,509 | 4/1992 | Katayama et al. | 364/419.08 |
| 5,117,349 | 5/1992 | Tirfing et al. | 395/600 |
| 5,414,834 | 5/1995 | Alexander et al. | 395/600 |
| 5,428,772 | 6/1995 | Merz | 395/600 |
| 5,430,836 | 7/1995 | Wolf et al. | 395/155 |

FOREIGN PATENT DOCUMENTS

| | | |
|---|---|---|
| 03-122717 | 3/1991 | Japan . |

OTHER PUBLICATIONS

Kennelly, C., "Digital Guide to Developing International Software", 1991, pp. 133–139.
"Current Time Style Bit", IBM Technical Disclosure Bulletin, vol. 32, No. 8B, New York, U.S., Jan. 1990, p. 380.
"Scientific Time Automatically Converted and Displayed", IBM Technical Disclosure Bulletin, vol. 32, No. 9A, New York, U.S., Feb., 1990, p. 269.

"Built–In Editing/Auditing Of Input In Data Fields", IBM Technical Disclosure Bulletin, vol. 32, No. 9A, New York, U.S. Feb. 1990, p. 270.

"Built–In Editing/Auditing Of Input In Time Fields", IBM Technical Disclosure Bulletin, vol. 32, No. 9A, New York, U.S. Feb. 1990, p. 288.

*Primary Examiner*—Thomas G. Black
*Assistant Examiner*—John C. Loomis
*Attorney, Agent, or Firm*—Jeffrey S. LaBaw; Lisa L. B. Yociss; Andrew J. Dillon

[57] ABSTRACT

User specification of cultural bias during creation of a database allows for managing cultural bias of the database on a distributed data processing system. Upon creation of a database, it is determined if a cultural tag is specified by the user. A default cultural tag is provided if it is determined that no user specified cultural tag is provided. In some embodiments, the cultural tag is subject to validation. The user specified cultural tag or default cultural tag is then placed in a configuration file for the database. Query, change, or reset of the default cultural tag is also provided.

14 Claims, 6 Drawing Sheets

SPECIFICATION OF CULTURAL BIAS IN DATABASE MANAGER

BACKGROUND OF THE INVENTION

1. Technical Field

The invention relates to database managers and more particularly to creation of databases on distributed data processing systems. Still more particularly, the invention relates to providing for user definition of cultural bias of databases upon creation, and modification of cultural bias after creation, notwithstanding use of different operating systems on the nodes of the distributed system.

2. Description of the Prior Art

When a database is created using a database manager product such as the OS/2 Extended Services Database Manager of International Business Machines Corp., a country code is permanently assigned to the database to set a cultural bias. Cultural bias determines such things as how dates are expressed, time information is interpreted and formatted, and how character data is compared. Assignment of a country code is not an explicit user operation. Upon issuance of a CREATE DATABASE command from an application (i.e. a process executing in an OS/2 operating system environment), the country code of the application is assigned to the new database.

Several problems result from this arrangement. First and most obvious, the user of the computer from which the database is created has only indirect control over the country code assigned the database. It becomes difficult to port the database manager to other operating platforms because of the need to determine the application country code on each platform. Creation of a database from a client on a network cannot be permitted, partly because of problems associated with the need to determine the application country codes on each client node of the network.

Perhaps the most significant difficulty raised is that databases are limited to those country codes supported by the operating system of the client/server. It is common to construct a database client-server network where the server is provided by a workstation running the OS/2 operating system or a derivative of the UNIX operating system (e.g. AIX) and the clients run the MS-DOS/WINDOWS operating system. Normally it would be preferable to allow specification of the cultural bias from the client, as such a choice would eliminate data confusion and even corruption that can result from use of different cultural biases between client and server. However, the WINDOWS shell supports country codes that are not supported by the OS/2 operating system. A client operating the WINDOWS shell and configured for a country code not supported by the OS/2 operating system is exposed to the problems arising from mismatched cultural biases and the subsequent affect on processing. The OS/2 operating system and the DBM database manager are available from IBM corporation.

SUMMARY OF THE INVENTION

It is an object of the invention to provide a system and method for user definition of cultural bias of databases upon creation.

The foregoing and other objects are achieved as is now described. The invention provides a system and method for managing cultural bias of a database on a distributed data processing system by allowing user specification of cultural bias during creation of the database. Upon creation of a database, it is determined if a cultural tag is specified by the user. A default cultural tag is provided if it is determined that no user specified cultural tag is provided. In some embodiments, the cultural tag is subject to validation. The user specified cultural tag or default cultural tag is then placed in a configuration file for the database. Query, change, or reset of the default cultural tag is also provided.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
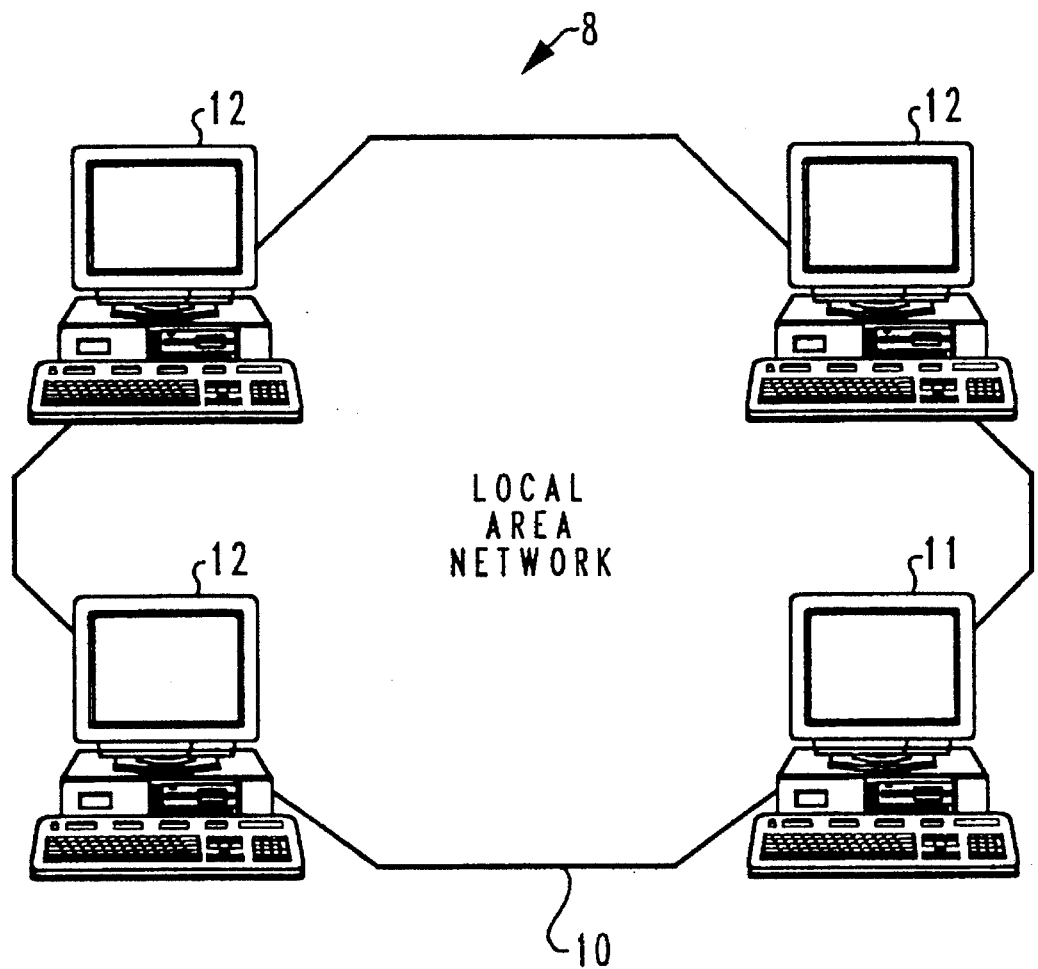
FIG. 1 is a pictorial illustration of a local area network.

With reference now to the figures and in particular with reference to FIG. 1, there is depicted a pictorial representation of a local area network which may be utilized in accordance with the method of the present invention. Local area network 8 supports user access from clients of databases maintained on a server. Local area network 8 provides data communication over a transmission channel 10 between a plurality of client personal computers 12 and a server 11. Clients 12 within the depicted system are preferably provided by utilizing an IBM personal computer, an IBM Personal System/2 or other similar system. The server 11 may, for example, be a workstation.

Figure 2:
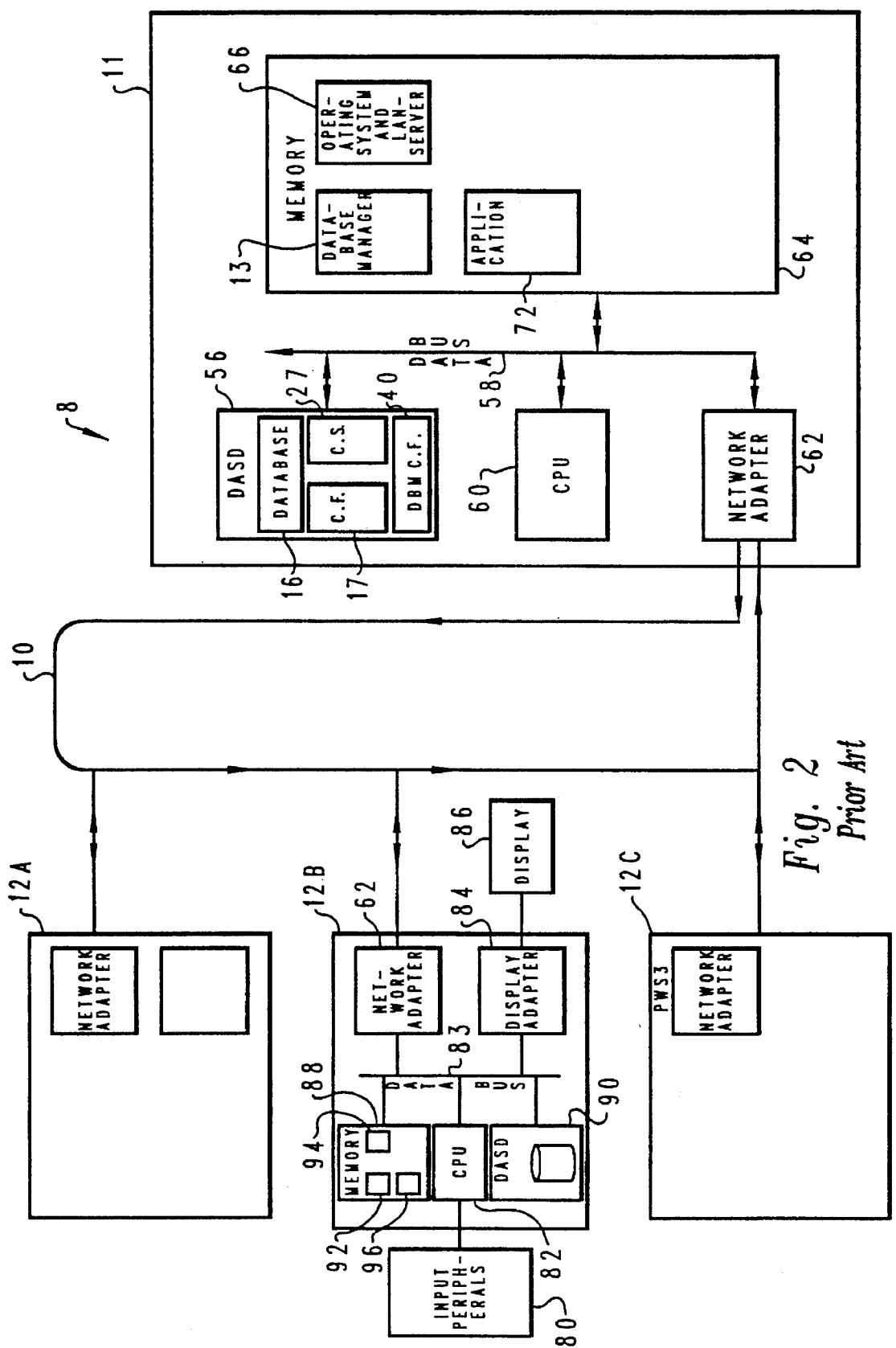
FIG. 2 is a block diagram of the local area network of FIG. 1.

FIG. 2 depicts a block diagram of local area network 8 in greater detail. Description of the invention in connection with a local area network having a token ring geometry is intended as illustrative only and not intended to imply that the invention is not applicable in different types of distributed processing environments, such as wide area networks. Server 11 communicates with computers 12a–12c over a communications channel 10. Server 11 is a conventional computer programmed to practice this invention, and includes a central processing unit 60, a memory 64, and a network adapter 62 for formatting outgoing transmissions and for deformatting incoming transmissions. Server 11 includes a hard drive unit 56 storing a plurality of shared databases pending updates and queries from one or more users using clients 12a–12c. A data bus 58 carries data between functional units of server 11. Resident in memory 64 are an operating system and local area network server 66. Also resident is a database management system 13 for creating and accessing databases 16 stored on direct access storage device (DASD) 56 and potentially one or more active processes for applications 72. A database configuration file 17, a cultural store 27 and a database manager configuration file 40 also reside on DASD unit 56.

Users access the shared data objects through client computers 12a–12c. Computer 12b will be considered as a typical example. Computer 12b is substantially similar to server 11, and includes a network adapter 62, a display adapter 84, a DASD unit 90, a central processing unit (CPU) 82 and an addressable memory 88. Components of computer 12b transfer data internally over a data bus 83. CPU 82 directly controls input peripherals 80 which may include a keyboard and a mouse. Display adapter 84 drives a display device 86. Memory 88 may include a logical table 92 derived from one or more database relations on server 11 in response to a query. Also present is a command structure 94 for use in establishing a communications session on network 8 and operating computer 12b. Command structure 94 includes an operating system which may support differing cultural biases than operating system 66. Also present in memory 88 is an application program 96.

Figure 3A:
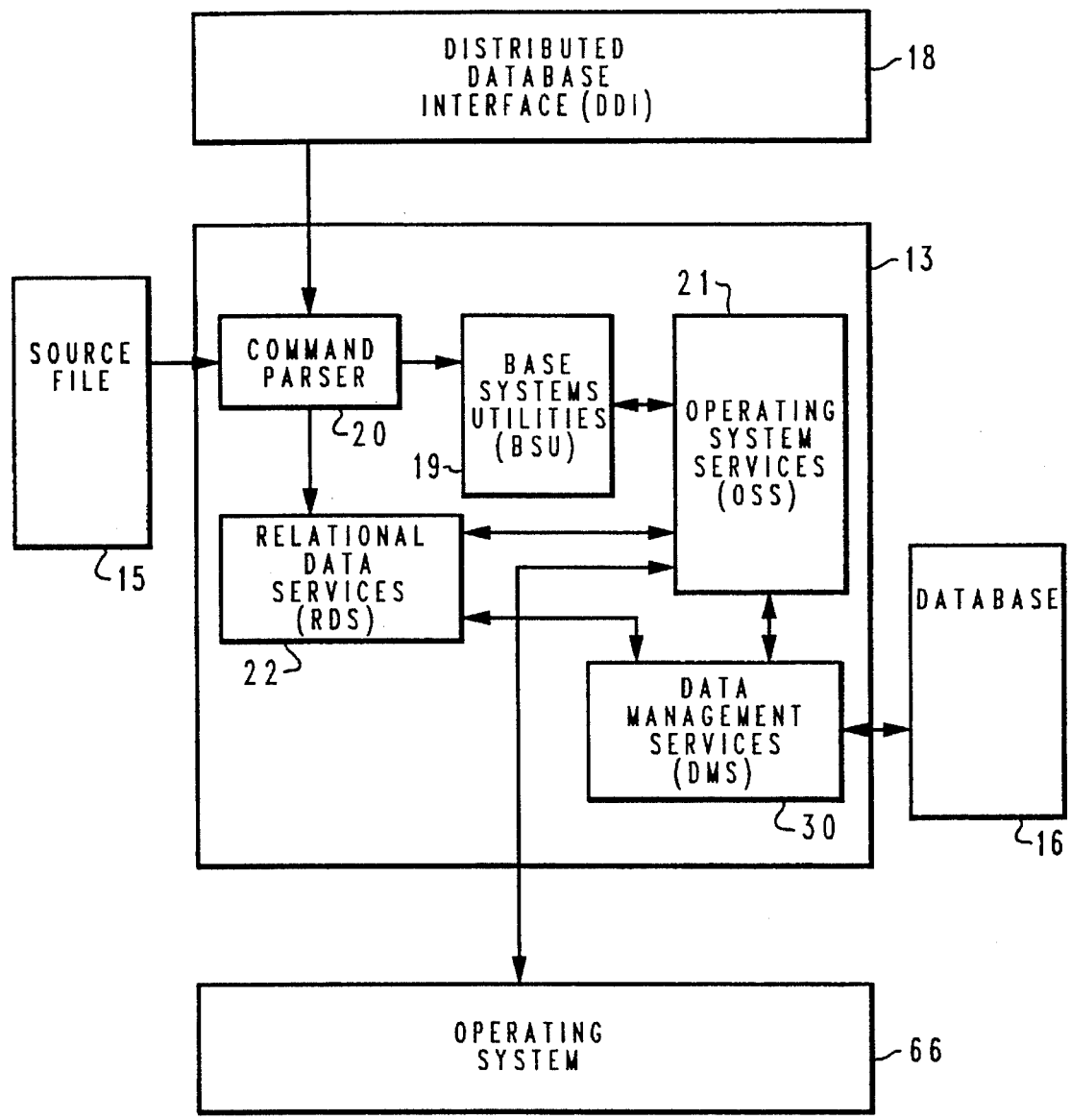
FIGS. 3A and 3B illustrate a high level block diagram of a relational database manager.

FIG. 3A is a high level functional block diagram of a relational database management system 13 used with the OS/2 and the AIX operating systems. Database management system 13 responds to user requests contained in a source file 15, or remote requests received over a distributed database interface 18, for update, deletion, creation or recovery of records. Most user requests are expressed in a command language such as SQL. However, CREATE DATABASE requests and other database management operations are not formally part of SQL.

Database management system 13 includes a command parser 20, such as an SQL language processor. Command parser 20 provides analysis of the contents of host language source file 15 and remote requests. Command parser 20 routes commands to the appropriate component, those being relational data services (RDS) 22 for relational data operations and base systems utilities (BSU) 19 for database management operations.

RDS 22 has a number of functions including processing the access and modify requests. Data are passed from RDS 22 to data management services 30 to carry out operations on the database 16. Data management services (DMS) 30 provides concurrence control and handles data recovery in a database 16. DMS 30 performs all normal access method functions. DMS 30, for purposes of this discussion, includes buffer management functions and provides file locking services. Operating system services (OSS) 25 insulates database management system 13 from operating system 66.

In order for database management system 13 to support cultural characteristics independent of operating system 66 support of cultural characteristics, the following functions must be provided:

(1) the ability to collate character information; and (2) date and time formatting, over and above the run time functions and libraries available to the operating system. This is done by providing, accessible to the database manager, extra run time functions and libraries.

Figure 3B:
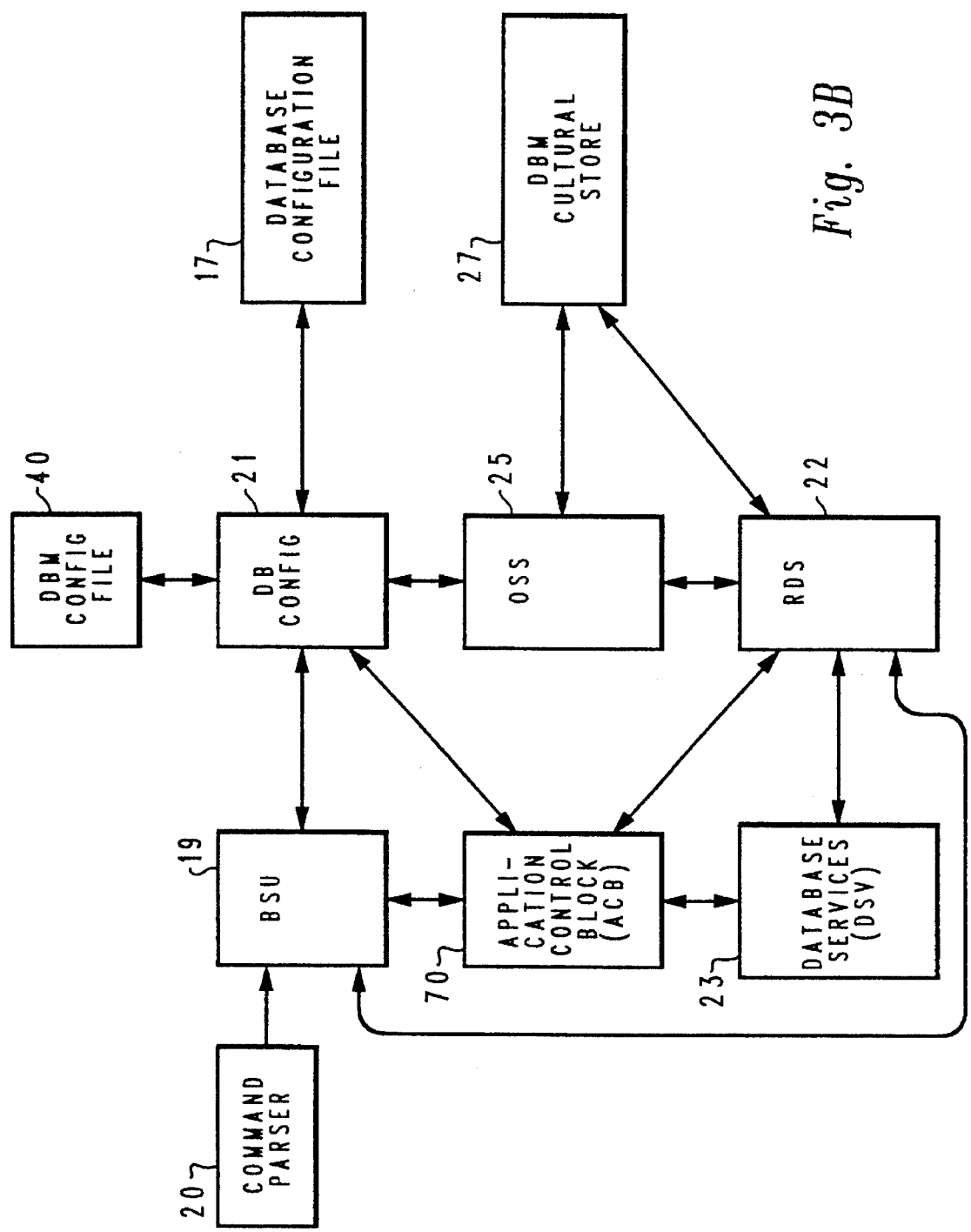

FIG. 3B illustrates several components of the database management system 13 and data stores which are involved in cultural aspects of the database management system 13 and a particular database 16. BSU 19 is a general purpose utility component which handles, among other database management operations received from command parser 20, the creation and initialization of a database. BSU 19 also manages creation and initialization of an application control block (ACB) 70, the functions of which are described below.

BSU 19 interacts with DB Configuration component 21 and RDS 22. DB configuration component 21 serves database management system 13 as a callable interface to a database manager configuration file 40 and to a database configuration file 17 for a database 16. RDS 22 accesses database manager cultural store 27 to obtain date/time information. Database services (DSV) 23 provides date and time calculations to RDS 22.

OSS 25 routes system calls to interfaces unique to the database management system 13 when they exist, letting all other calls pass through to the operating system. In particular, OSS 25 reroutes a call from Config 21 for collation information to database cultural store 27. Application Control Block 70 is initialized and managed by BSU 19 and is a runtime repository for all database-specific cultural information. Database manager cultural store 27 is the repository of all date/time formats and default collating sequences supported by the database management system 13.

Upon receipt of a CREATE DATABASE command, command parser 20 passes the command to BSU 19, which gets the cultural tag from the user or the DBM configuration file 40 via Config 21. BSU 19 puts the cultural tag into Application Control Block 70. Config 21 copies the cultural tag from ACB 70 into the database configuration file 17. If the user specified a collating sequence with the CREATE DATABASE command, BSU 19 puts the collating sequence into ACB 70.

Config 21 can check ACB 70 for a collating sequence and if present can copy the collating sequence into database configuration file 17. If no collating sequence is present in ACB 70, Config 21 reads the cultural tag in ACB 70 and passes it to OSS 25 with a call to obtain collating information corresponding to the cultural tag. OSS gets the collating information from the database cultural store 27 and returns it to Config 21. Config 21 then copies the collating information into the database configuration file 17, and configuration of database cultural aspects is complete.

When starting a database, BSU 19 initializes ACB 70 with a call to Config 21 to read the database configuration file 17 to obtain the database cultural tag and collating information and with a call to RDS 22 to read the DBM cultural store 27 to obtain the date/time formats corresponding to the database cultural tag. During runtime execution of database operations RDS 22 uses the collating information in ACB 70 and DSV 23 uses the date/time formats in ACB 70.

Figure 4:
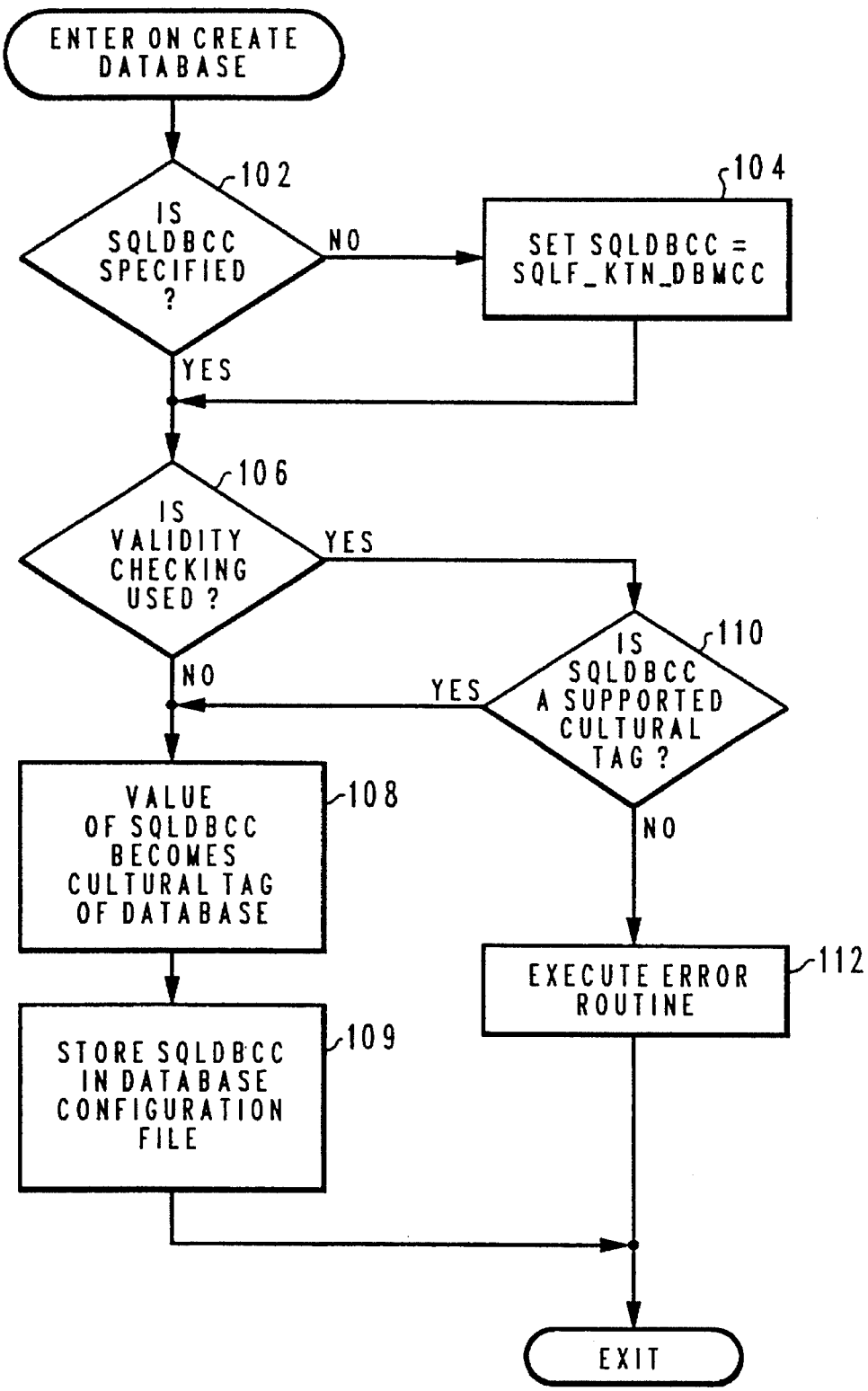
FIG. 4 is a logical flow chart for a process of defining a cultural bias for a database upon creation of the database.

FIG. 4 illustrates a logical flow chart for a process for implementing the invention. The process is entered at step 100 with a user request to "CREATE DATABASE". At step 102 it is determined if the user specified the parameter SQLDBCC with the CREATE DATABASE command. SQLDBCC is typically specified using country code (CC) tags drawn from operating systems such as OS/2 and DOS, or operating system shells such as Windows. If no cultural tag is provided, SQLDBCC is set equal to SQLF_KTN_DBMCC from the database management configuration file 40.

After a value has been set or provided by a user for SQLDBCC step 106 is executed to determine if validity checking on the cultural tag is used. If not, execution of step 108 sets the database cultural tag value equal to SQLDBCC. The process is then exited. Where validity checking is done, step 110 represents execution of the validation process. A cultural tag is considered valid if it is supported by database management system 13. Successful validation returns processing to step 108. Invalidation of the cultural tag results in execution of an error routine 112, which may be used to inform the user of the problem and invite correction.

Figure 5:
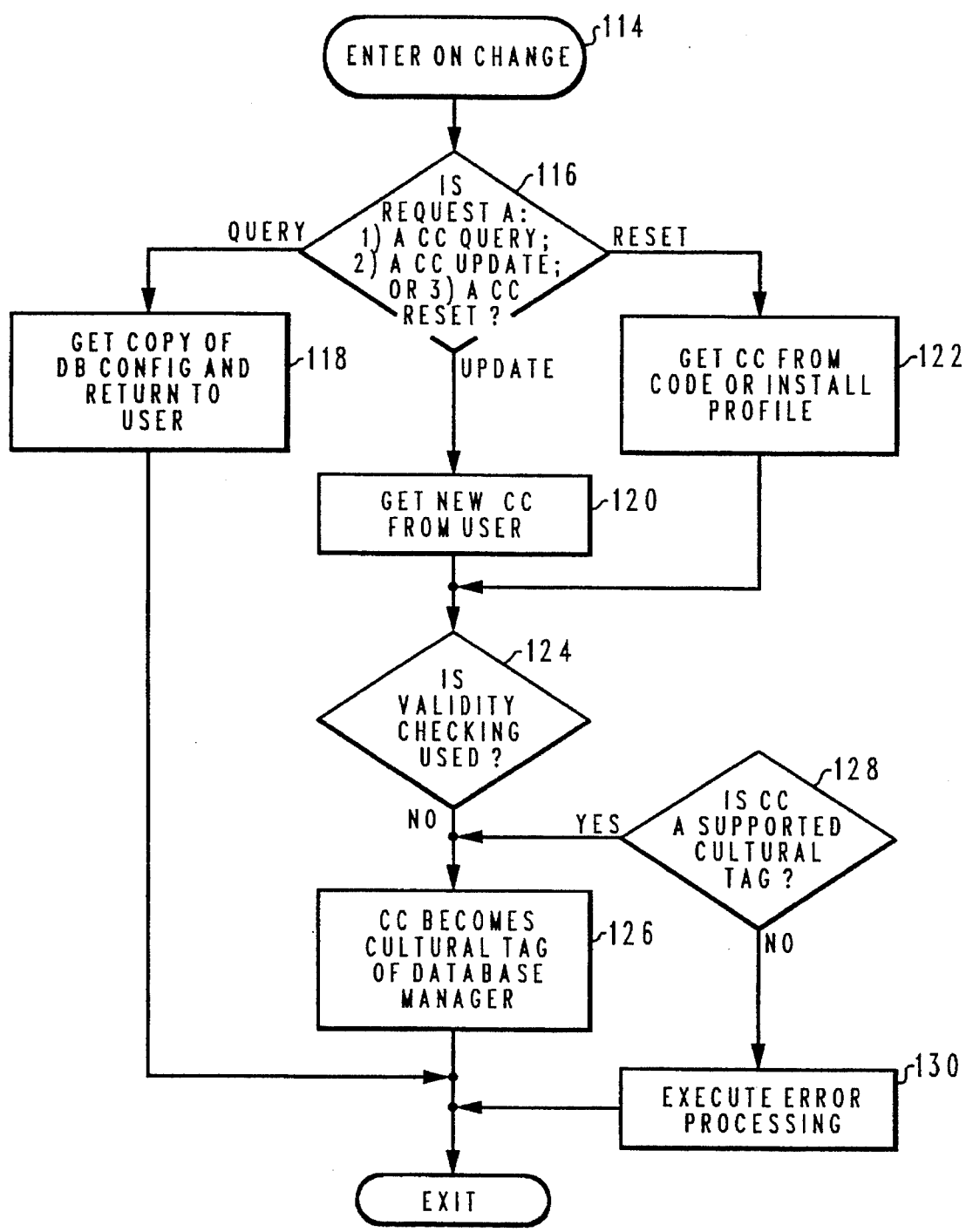
FIG. 5 is a logical flow chart for a process of changing the default cultural tag a database manager.

FIG. 5 is a logical flow chart of a process for changing a database manager configuration file 40 upon entry of such a command for change with step 114. With execution of step 116 the process determines if the user change request is: (1) a query; (2) an update; or, (3) a reset to an initial installation value. A query involves simple retrieval and return to the user of the cultural tag (step 118). If a user update of the cultural tag is specified, step 120 is used to get the new cultural tag (e.g., country code) from the user. If the user has specified a reset, step 122 specifies retrieval of a cultural tag from an installation profile file or hard coded value.

After steps 120 or 122 validity checking may be done. Step 124 is executed to determine if validity checking on the cultural tag is used. If not, execution of step 126 sets the database manager cultural tag value equal to CC. The process is then exited. Where validity checking is done, step 128 represents execution of the validation process. A cultural tag is considered valid if it is supported by database management system 13. Successful validation returns processing to step 126. Invalidation of use of the CC for a cultural tag results in execution of an error routine 130, which may be used to inform the user of the problem and invite correction.

Use of the country code (CC) tag of the OS/2 and DOS operating systems, or Windows shell, as a cultural tag is not the only tagging scheme which works. It is used here as a convenient cultural declaration and no promotion of it as a convention is intended. Another scheme could be developed which would be more specific to cultures (e.g., Canadian English and Canadian French) than are country codes. The present invention accommodates cultural declarations more specific than country codes.

Commands and syntax to implement the method of the invention are now described. The CREATE DATABASE application program interface (API) includes a parameter called dbdesc, which is an extendable database description block. The fields of the description block are set out in Table 1.

TABLE 1

Fields in the Database Description Block Structure

| Field Name | Data Type | Description |
|---|---|---|
| SQLDBDID | CHAR (8) | A structure identifier and "eye-catcher" for storage dumps. It is a string of eight bytes with the value 'SQLDBDB0' (if SQLDBCC is not specified) or 'SQLDBDB1' (if SQLDBCC is specified). The contents of this field are validated for version control. |
| ... | ... | ... |
| ... | ... | ... |
| ... | ... | ... |
| SQLDBCC | INTEGER | The country code (CC) to assign to the database. This parameter is optional. |

SQLDBCC is optional for backward compatibility with existing OS/2 Extended Services Database Manager applications. Hence, as provided above, a default CC is available when SQLDBCC is not specified. The configuration file is modified to provide a parameter, SQLF_KTN_DBMCC, for the CC default value.

Table 2 is a definition of a database manager configuration file modified to support practicing the invention. SQLF_KTN_DBMCC is initialized upon installation of the database manager, but can be modified by use of a function, UPDATE DATABASE MANAGER CONFIGURATION FILE API.

TABLE 2

Database Manager Configuration File Entries

| Token | Token Value | Entry Data Type | Description |
|---|---|---|---|
| ... | ... | ... | ... |
| ... | ... | ... | ... |
| ... | ... | ... | ... |
| ... | ... | ... | ... |
| ... | ... | ... | ... |
| ... | ... | ... | ... |
| SQLF_KTN_DBMCC | 11 | SMALLINT | Default database country code (CC) if not explicitly specified during database creation. |
| ... | ... | ... | |
| ... | ... | ... | |

The following APIs specific to management of the configuration file are enhanced to extend to processing of the SQLF_KTN_DBMCC parameter.

(1) GET COPY OF DATABASE MANAGER CONFIGURATION FILE
(2) UPDATE DATABASE MANAGER CONFIGURATION FILE
(3) RESET DATABASE MANAGER CONFIGURATION FILE

In the case of (1), the current value of SQLF_KTN_DBMCC is simply returned with other configuration file values for display. For (2), the user is allowed to specify a value for the SQLF_KTN_DBMCC parameter that replaces the current value in the configuration file. For (3), the configuration file value of SQLF_KTN_DBMCC is restored to its installation value.

Validity checking against a table of valid culture tags can be avoided by use of a defaulting scheme. In other words, if an unrecognized CC is used, a default environment is established. Validation of country code selection may also be added as design insurance against selection of unintended tags.

In summary, a user in creating a database is given explicit control over cultural bias of a database. The porting of the database manager to other operating platforms is made easier by elimination of any need to determine the country code for the application on each platform. Although full support of database creation from a client is not achieved, the problem is simplified by eliminating the need to determine the country code of the client. It is now possible to create a database in any client country code independent of the country codes supported by the server platform, provided only that the database manager server itself supports the client country code. In particular, support of country codes for the Windows operating system without OS/2 operating system dependencies is provided for the DBM database manager.

Additional flexibility is afforded by the system and method of the invention, including making the default country code and its cultural aspects definable. Custom country codes independent of those supported by the server operating system may now be made available. Country code validity checking, upon specification, is supported if desired.

The country code convention may be replaced by different, and potentially more robust cultural tags for database operations.

While the invention has been particularly shown and described with reference to a preferred embodiment, it will be understood by those skilled in the art that various changes in form and detail may be made therein without departing from the spirit and scope of the invention.

What is claimed is:

1. A method of operating a database accessed over a distributed data processing system, comprising the steps of:

managing manipulation of a database;

specifying a creation of a database utilizing an application, wherein said application is associated with a first cultural tag;

determining if a user specified second cultural tag was provided by a user upon said specification of creation of the database;

providing a default third cultural tag if determined that no user specified second cultural tag is available;

placing the user specified second cultural tag, or default third cultural tag if no user specified second cultural tag is available, in a configuration file for the database; and creating the database utilizing said application in response to user selection, wherein the database includes either said second or third cultural tag which is different from said first cultural tag associated with said application.

2. A method as set forth in claim 1, further comprising:

validating said user specified second cultural tag; and displaying an error to the user if the user specified second cultural tag is invalid.

3. A method as set forth in claim 1, further comprising:

responsive to user selection, displaying a database management system cultural tag;

responsive to user selection, changing the database management system cultural tag; and responsive to user selection, restoring the database manager cultural tag to an installation value.

4. A method as set forth in claim 3, wherein the step of changing the database management system cultural tag further includes:

validating or invalidating the database management system cultural tag; and responsive to invalidation of the database management system cultural tag, giving indication of error to the user.

5. A storage media adapted to be used in conjunction with a data processing system for storing instructions, comprising:

means for specifying a creation of a database utilizing an application, wherein said application is associated with a first cultural tag;

means for determining if a user specified second cultural tag was provided by a user upon said specification of creation of the database;

means for providing a default third cultural tag if determined that no user specified second cultural tag is available;

means for placing the user specified second cultural tag, or default third cultural tag if no user specified second cultural tag is available, in a configuration file for the database; and means for creating the database utilizing said application in response to user selection, wherein the database includes either said second or third cultural tag which is different from said first cultural tag associated with said application.

6. A storage media adapted to be used in conjunction with a data processing system for storing instructions, as set forth in claim 5, further including:

means for validating a user specified cultural tag; and means for displaying an error to the user if the user specified cultural tag is invalid.

7. A storage media adapted to be used in conjunction with a data processing system for storing instructions, as set forth in claim 5, further comprising:

means responsive to user selection for displaying a database management system cultural tag;

means responsive to user selection for changing the database management system cultural tag; and means responsive to user selection for restoring the database manager cultural tag to an installation value.

8. A storage media adapted to be used in conjunction with a data processing system for storing instructions as set forth in claim 5, wherein the means for changing the database management system cultural tag further includes:

means for validating or invalidating the database management system cultural tag; and means responsive to invalidation of the database management system cultural tag for indicating error to the user.

9. A distributed data processing system, comprising a programmed data processing system for managing manipulation of a database, comprising:

application means for creating a database, wherein said application means is associated with a first cultural tag;

means for determining if a user specified second cultural tag is provided upon said specification of creation of the database;

means for providing a default third cultural tag if determined that no user specified second cultural tag is available;

means for placing the user specified second cultural tag or default third cultural tag in a configuration file for the database; and creating the database utilizing said application means in response to user selection, wherein the database includes either said second or third cultural tag which is different from said first cultural tag associated with said application means.

10. A distributed data processing system as set forth in claim 9, further comprising:

means for validating or invalidating said user specified second cultural tag; and means for displaying an indication of error to the user in response to invalidation of the user specified second cultural tag.

11. A distributed data processing system as set forth in claim 9 further comprising:

means for displaying said default third cultural tag for a database management system upon user selection;

means for changing the default third cultural tag upon user specification; and means for resetting the default third cultural tag to an installation value upon user selection.

12. A distributed data processing system as set forth in claim 11, further comprising:

means for validating or invalidating the default third cultural tag; and means for displaying an indication of error to a user in response to invalidation of the default third cultural tag.

13. The distributed data processing system for managing and providing access to a database according to claim 9, further comprising said server executing a first operating system, said plurality of clients executing a second operating system, and said application means being executed by one of said plurality of clients by said second operating system.

14. The distributed data processing system according to claim 9 further comprising a server on which a database manager runs, wherein a first operating system is being executed by said server;

a plurality of clients, each of said plurality of clients executing a second operating system;

a communications system interconnecting the clients with the server for transmitting database manipulation operations from clients to the server and for returning responses from the server to the clients; and said application means being executed by one of said plurality of clients by said second operating system.

* * * * *

UNITED STATES PATENT AND TRADEMARK OFFICE
CERTIFICATE OF CORRECTION

PATENT NO. : 5,546,573
DATED : August 13, 1996
INVENTOR(S) : Obermann et al.

It is certified that error appears in the above-indentified patent and that said Letters Patent is hereby corrected as shown below:

Column 2, line 29: insert --for-- after "tag"

Signed and Sealed this

Fifth Day of November, 1996

Attest:

BRUCE LEHMAN

Attesting Officer     Commissioner of Patents and Trademarks